United States Patent
Whikehart et al.

(10) Patent No.: US 7,200,377 B2
(45) Date of Patent: Apr. 3, 2007

(54) METHOD AND SYSTEM FOR MULTI-CHANNEL RF DIGITIZATION WITH ANALOG SELECTIVITY

(75) Inventors: J. William Whikehart, Novi, MI (US); Yao H. Kuo, W. Bloomfield, MI (US)

(73) Assignee: Visteon Corporation, Dearborn, MI (US)

( * ) Notice: Subject to any disclaimer, the term of this patent is extended or adjusted under 35 U.S.C. 154(b) by 848 days.

(21) Appl. No.: 09/876,190

(22) Filed: Jun. 6, 2001

(65) Prior Publication Data

US 2002/0187762 A1 Dec. 12, 2002

(51) Int. Cl.
*H04B 1/10* (2006.01)
*H04M 1/00* (2006.01)
*H04M 9/00* (2006.01)

(52) U.S. Cl. .................. 455/307; 455/306; 455/562.1; 379/413

(58) Field of Classification Search ................ 455/307, 455/306, 302, 562.1; 370/210; 375/346; 379/413

See application file for complete search history.

(56) References Cited

U.S. PATENT DOCUMENTS

| | | | |
|---|---|---|---|
| 5,280,636 A | 1/1994 | Kelley et al. | |
| 5,412,690 A | 5/1995 | Kotzin et al. | |
| 5,528,688 A * | 6/1996 | Schorr | 379/413 |
| 5,602,847 A | 2/1997 | Pagano et al. | |
| 5,668,836 A | 9/1997 | Smith et al. | |
| 5,870,402 A | 2/1999 | Kelley | |
| 6,314,083 B1 * | 11/2001 | Kishimoto et al. | 370/210 |
| 6,418,327 B1 * | 7/2002 | Carey et al. | 455/562.1 |
| 6,714,776 B1 * | 3/2004 | Birleson | 455/302 |
| 6,724,840 B1 * | 4/2004 | Osofsky et al. | 375/346 |
| 6,741,847 B1 * | 5/2004 | Claxton et al. | 455/306 |

* cited by examiner

*Primary Examiner*—Wing Chan
*Assistant Examiner*—Thjuan P. Knowlin
(74) *Attorney, Agent, or Firm*—Artz & Artz, P.C.

(57) ABSTRACT

A system (10) and method (100) for digitizing a complete band of RF channels to allow simultaneous processing of more than one channel. Multiple tunable bandpass filters (14) are used for the particular channels to be processed. The filter outputs are combined (16) to form one signal for digitization (18). In another embodiment, an undesired signal is rejected (112) to provide more available power for a reception of a desired signal.

8 Claims, 3 Drawing Sheets

METHOD AND SYSTEM FOR MULTI-CHANNEL RF DIGITIZATION WITH ANALOG SELECTIVITY

TECHNICAL FIELD

The present invention relates generally to a digital RF receiver, and more particularly to a digital RF receiver capable of simultaneously serving multiple users.

BACKGROUND OF THE INVENTION

The conventional approach to simultaneously receiving multiple channels in a receiver is to simply provide multiple receivers, with a separate receiver assigned for each channel. Each additional receiver carries a penalty in terms of cost, weight, power and space requirements for additional hardware.

An alternate approach is to digitize the full range of a particular band of frequencies, and use digital signal processing (DSP) after digitization to process channels in the band. This approach may reduce the penalties described above. However, the capability is beyond currently available analog-to-digital converter (ADC) technology. Therefore, multiple ADC's are required to digitize multiple channels in a band.

A method has been proposed for providing multiple simultaneous access to signals within a band that are widely separated in frequency using a single ADC. The separate signals are translated in frequency so that they form a single, generally continuous composite band thereby eliminating the wide frequency gap between the signals. However, the translation requires mixing and filtering the different signals and a local oscillator for each signal. Dividing at least one band into portions that are overlapped further reduces the bandwidths. Thus although one ADC may be used, the additional hardware required for each signal does not reduce the overall cost and complexity associated with multiple ADC's.

SUMMARY OF THE INVENTION

It is an object of the present invention to provide digitization of a predetermined number of channels within a complete band of RF channels to allow simultaneous processing of more than one channel.

It is another object of the present invention to reduce the bandwidth before digitization using multiple independently tunable bandpass filters with outputs that are combined to form one signal for digitization.

Still a further object of the present invention is to absorb strong undesired channels that could overload the receiver system.

In carrying out the above objects and other objects and features of the present invention, multiple tunable bandpass filters are used for the particular RF channels to be processed. The filter outputs are combined to form one signal for digitization.

Other objects and advantages of the present invention will become apparent upon reading the following detailed description and appended claims, and upon reference to the accompanying drawings.

BRIEF DESCRIPTION OF THE DRAWINGS

For a more complete understanding of this invention, reference should now be had to the embodiments illustrated in greater detail in the accompanying drawings and described below by way of examples of the invention. In the drawings:

FIG. 8$b$ is a graph of the power output at the first tunable bandpass filter;

FIG. 8$c$ is a graph of the power output at the second tunable bandpass fitler;

FIG. 8$d$ is a graph of the power output after a first automatic gain control;

FIG. 8$e$ is a graph of the power output after a second automatic gain control;

FIG. 8$f$ is a graph of the power output provided to the receiver; and

DETAILED DESCRIPTION OF PREFERRED EMBODIMENTS

Figure 1:
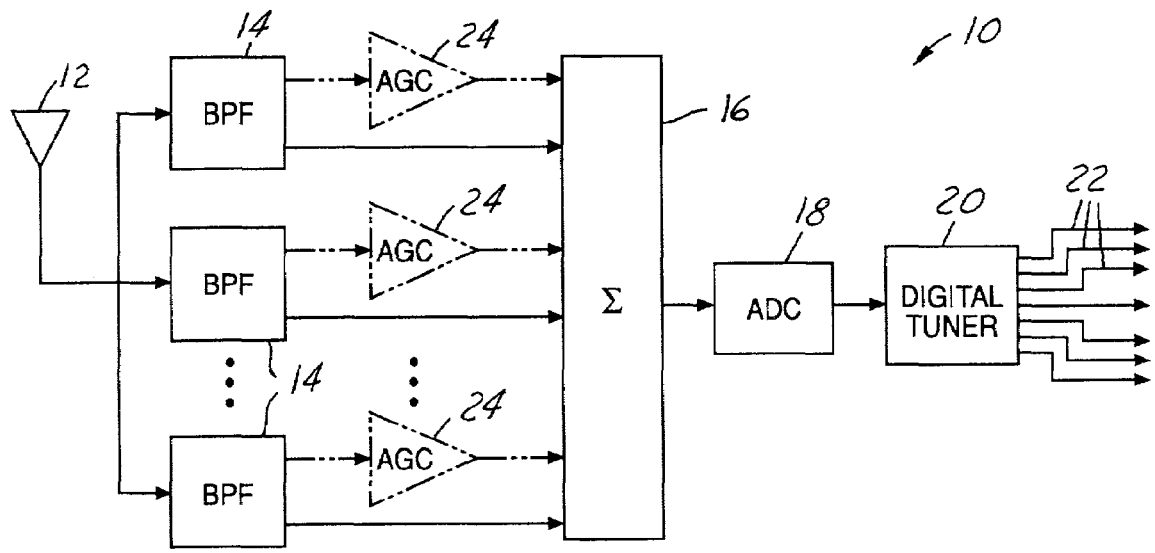
FIG. 1 is a block diagram of the present invention for processing a received RF signal for multiple users.

The present invention is described herein with reference to a complete band of frequencies for a particular mode of communication, such as frequency modulation (FM) channels. It should be noted however, that the present invention is applicable to other bands and frequencies as well. One skilled in the art is capable of translating the present invention to other modes. FIG. 1 is a block diagram of the system 10 of the present invention. An antenna 12 receives a complete band for a particular mode of communication, for example FM. A plurality of tunable bandpass filters 14 are provided for selecting a desired channel. The bandpass filters 14 may all operate on the same broadcast band, i.e. AM or FM, but are capable of independently tuning to a specific channel. The outputs of the bandpass filters 14 are combined at a summer 16 to form one signal for digitization at a single ADC 18.

The digitized signal is sent to a digital signal processor 20 where the selected channels 22 are independently processed to provide usable signals, such as audio or data signals, to users in the vehicle. Examples of users include, but are not limited to, vehicle occupants that are listening to the radio, or devices for data handling such as RDS.

First, the present invention allows for tuning to one received frequency to improve the signal-to-noise ratio prior to analog to digital conversion. This lowers the required dynamic range of the ADC, and thus lowers the cost of the ADC. Second, the present invention allows more than one user to receive different channels at the same time. And third, it is possible according to the present invention to prevent an undesired signal from overloading the receiver.

Figure 2:
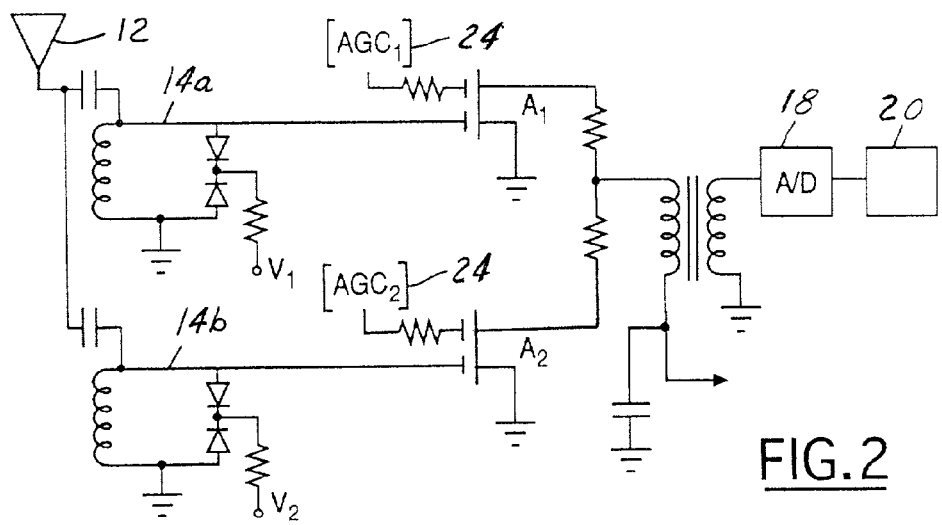
FIG. 2 is a circuit diagram of one embodiment of the block diagram shown in FIG. 1.

FIG. 2 is a more detailed schematic of one embodiment of the present invention, which is just one of many examples of implementing the block diagram of FIG. 1 and will be used to describe the three scenarios outlined above. In the example shown in FIG. 2, two bandpass filters are shown. However, it should be noted that there it is possible to use more bandpass filters and only two are shown for a simplified explanation of the present invention. Like reference numbers between FIGS. 1 and 2 represent like elements.

Referring still to FIG. 2, a first tunable bandpass filter 14a has a tuning voltage $V_1$ for a first selection and a second tunable bandpass filter 14b has a tuning voltage $V_2$ for a second selection. The antenna 12 output can only deliver fixed power at a fixed position and fixed time across a fixed bandwidth. Therefore, at any moment, the tuner input circuits will drain maximum power from the antenna 12 at selected frequencies.

Figure 3:
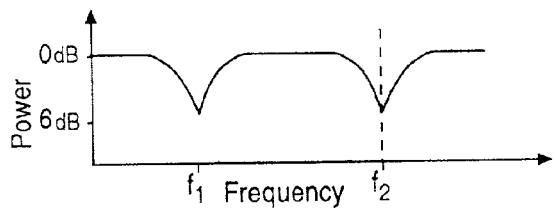
FIG. 3 is a graph of the antenna power for two frequencies.
Figure 4:
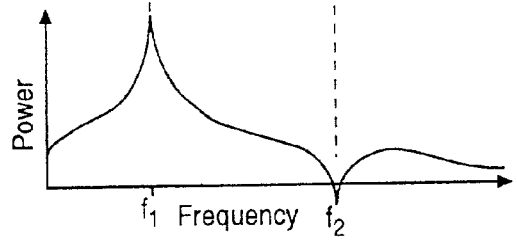
FIG. 4 is a graph of the output power at the first tunable bandpass filter tuned to a first frequency.
Figure 5:
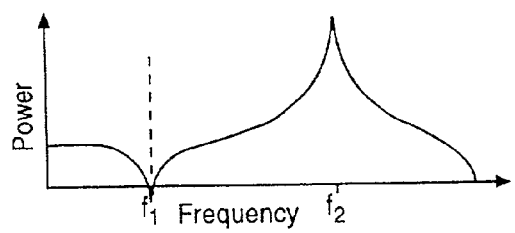
FIG. 5 is a graph of the output power at the second tunable bandpass filter tuned to a second frequency.

FIG. 3 is a representation of the antenna power at the antenna output. Say for example, the first tunable bandpass filter 14a is tuned by a voltage $V_1$ for frequency $f_1$. The graph of FIG. 4 shows the higher power at the selected frequency $f_1$ and the lesser power at $f_2$, the unselected frequency. Likewise, FIG. 5 shows the power for the second tunable bandpass filter 14b that is tuned by voltage $V_2$ for frequency $f_2$. There is considerably less power at $f_1$, the unselected frequency, and high power at the selected frequency $f_2$.

Figure 6:
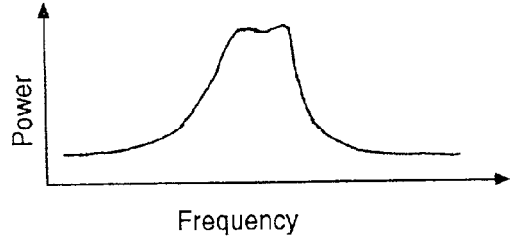
FIG. 6 is a graph of the output power for simultaneous tuning of two bandpass filters to the same frequency according to the present invention.

In the case where both of the tunable bandpass filters are tuned to the same frequency, shown in FIG. 6, the present invention is capable of drawing maximum power from the antenna. When the filters are tuned close to each other, the bandpass filters are combined. In the present example, a double bandpass filter is formed to provide maximum reception of the selected channel and maximum rejection of undesired channels.

Figure 7:
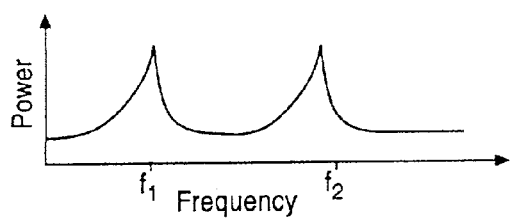
FIG. 7 is a graph of the output power for tuning of two bandpass filters to different frequencies according to the present invention.

In the case where the filters are tuned to different frequencies for "listening" to more than one channel at a time, the output shown in FIG. 7 is achieved by the present invention. "Listening" in the present invention may be an occupant who is actually listening to a broadcast channel, or it may be a different user, such as a device that is receiving RDS data broadcast over a channel. In any event, with the present invention each frequency draws equal power thereby, providing equal reception at each channel, independent of the signal strength.

Automatic gain controls [$AGC_1$] and [$AGC_2$] along with a respective amplifier A1 and A2, can be provided at the filter 14a and 14b outputs in order to substantially equalize the signals before summing and digitization. In this regard, the strong signals will be balanced with the weaker signals thereby preventing the strong signals from overriding the weaker signals. Consider the case where the stronger signal exists at the input to amplifier A2 and the weaker signal exists at the input to A1. In order to balance the signals, the automatic gain control [$AGC_2$] and the amplifier A2 should be set at a relatively higher gain reduction, and the automatic gain control [$AGC_1$] and the amplifier A1 should be set at a relatively lower gain reduction.

Figure 8A:
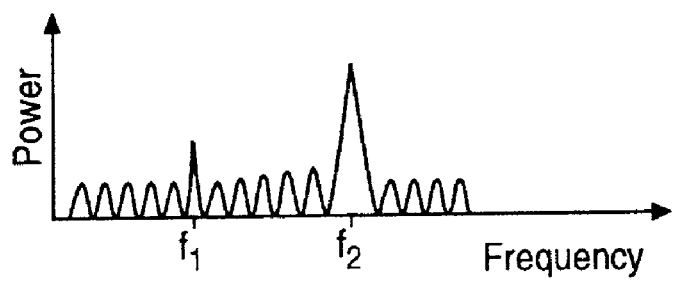
FIG. 8$a$ is a graph of the air signal strength of two separate frequencies at the antenna.

A further application of the multiple bandpass system of the present invention is to reject strong undesired channels that could overload the system. In this application, one or more bandpass filters can be tuned to one or more of the undesired channels to absorb the undesired signals. In this case, shown in the series of FIGS. 8a through 8f, the first bandpass filter is tuned to a desired frequency having a weak signal strength. FIG. 8a shows the air signal strength at the antenna for each of a desired frequency $f_1$ and an undesired frequency $f_2$. Frequency $f_1$, the desired frequency has a weaker signal than the undesired frequency $f_2$.

Figure 8B:
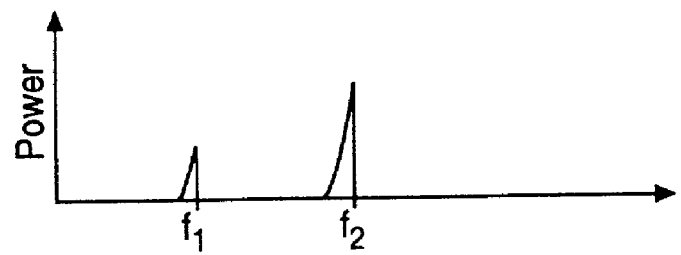
Figure 8C:
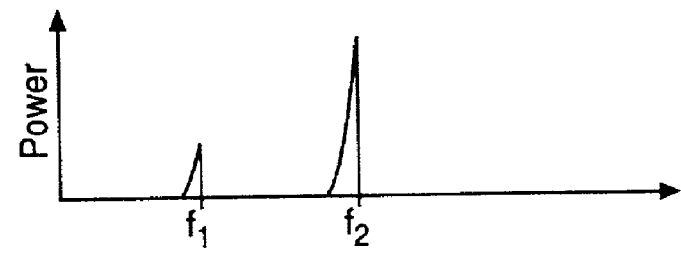

The first tunable bandpass filter is tuned to the desired frequency $f_1$. FIG. 8b shows the power at the output of the first tunable bandpass filter. However, because the undesired signal is so strong, it still appears more powerful than the signal at frequency $f_1$. In order to strengthen the signal at $f_1$, it is necessary to absorb the undesired signal at frequency $f_2$. This is accomplished by tuning the second bandpass filter to $f_2$. FIG. 8c shows the power at the output of the second tunable bandpass filter.

Figure 8D:
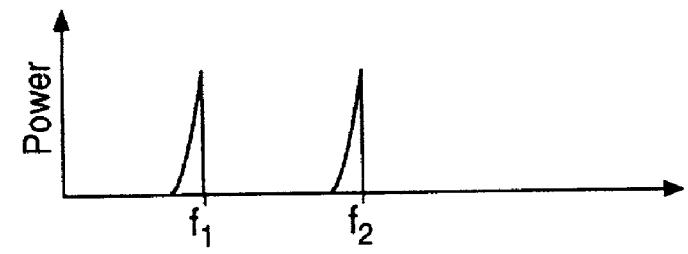
Figure 8E:
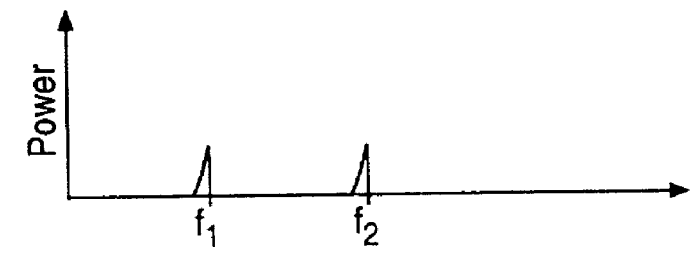

FIG. 8d shows the power output after the first automatic gain control [$AGC_1$] and amplifier A1. The second automatic gain control [$AGC_2$] is turned to the maximum gain of its gain control range. For example, the automatic gain control may have a gain control range of 20 dB. The minimum gain setting for [$AGC_2$] and amplifier $A_2$, selects the undesired signal for rejection. FIG. 8e shows the output power after the second tunable bandpass filter and amplifier.

Figure 8F:
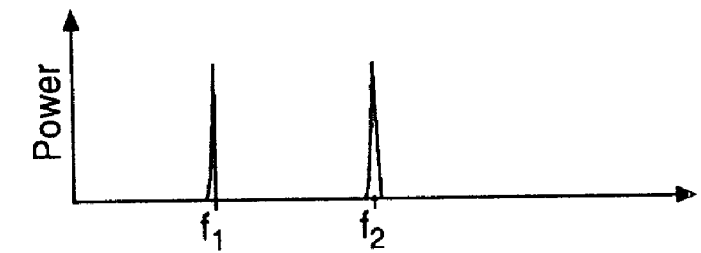

FIG. 8f shows the output provided to the receiver in which the signals at $f_1$ and $f_2$ are modified before being processed. The present invention effectively reduces the strength of the undesired signal, and improves the strength of the desired signal.

The bandpass filters and automatic gain control being set in accordance with the present invention significantly increase the dynamic range of the signal strength and desired frequencies before digitization is required, thereby eliminating the need for multiple ADC's. In addition, there is no need for an intermediate frequency, eliminating the need for multiple local oscillators and their associated mixing hardware.

Figure 9:
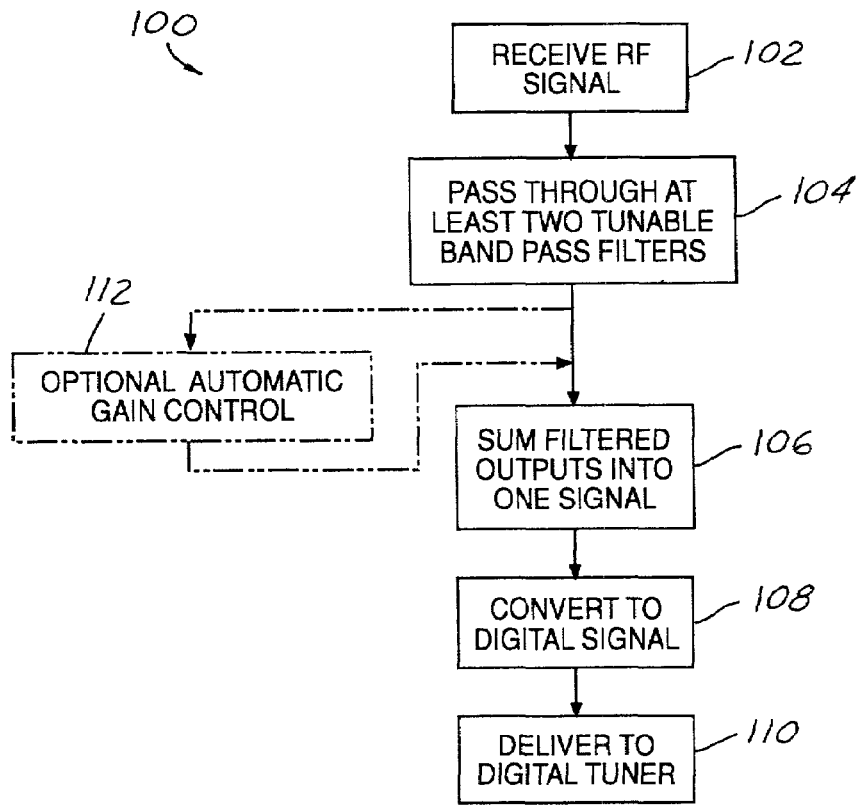
FIG. 9 is a flow chart of the method of the present invention.

FIG. 9 is a flow chart of the method 100 of the present invention. An analog RF signal from the desired bandwidth is received 102 by the antenna. At least two tunable bandpass filters are used to select 104 a desired channel on the desired bandwidth. The channels can be different from each other, but are selected from a single broadcast band, i.e. AM or FM. As stated above, the number of bandpass filters is typically related to the number of users. One skilled in the art is capable of determining a practical number of filters.

The filtered output is summed 106 into one signal. The summed signal is digitized 108 in a single ADC and delivered 110 to a digital tuner where the desired frequencies are made available to the vehicle's occupants.

In an alternative embodiment, the filtered outputs are made to have substantially equivalent levels 112 by automatic gain controllers. This feature ensures that the weaker signals are not overridden by stronger signals and that each channel chosen is equal in strength.

The present invention also has utility in a data logging application. Data logging typically requires two tuners. One tuner is used for listening to a single channel; the other tuner scans other frequencies looking for predetermined data. With the system and method of the present invention, data logging can be accomplished using a single tuner. One bandpass filter can be used to tune to a particular channel for listening, while one or more of the remaining bandpass filters can be used to scan available channels.

The invention covers all alternatives, modifications, and equivalents, as may be included within the spirit and scope of the appended claims.

What is claimed is:

1. A receiver for simultaneously processing multiple channels in a broadcast band, said receiver comprising:
   at least one antenna for receiving analog RF signals;
   a plurality of tunable bandpass filters, each tunable bandpass filter for filtering said analog RF signals, each tunable bandpass filter for tuning to a desired frequency signal, thereby defining multiple desired signals;
   a summer for summing said multiple desired signals into one summed signal;
   a digitizer for digitizing said summed signal; and
   a digital tuner capable of simultaneously processing only the multiple desired signals from said digitized signal.

2. The receiver of claim 1 wherein at least two tunable bandpass filters are tuned to the same desired frequency and combine to draw maximum power for reception of said desired frequency.

3. The receiver of claim 1 wherein at least one tunable bandpass filter in said plurality of tunable bandpass filters is tuned to a first desired frequency and another of said tunable bandpass filters in said plurality of tunable bandpass filters is tuned to a second desired frequency for simultaneous reception of at least two different desired frequencies.

4. The receiver of claim 1 further comprising an automatic gain controller and an amplifier at the respective output of each of said plurality of bandpass filters.

5. The receiver as claimed in claim 4 further comprising at least one tunable bandpass filter in said plurality of bandpass filters being tuned to a first desired frequency and another of said tunable bandpass filters in said plurality of said tunable bandpass filters being tuned to a second undesired frequency; and
   wherein said automatic gain controller and amplifier at said output of said tunable bandpass filters that is tuned to said undesired frequency is set at a minimum gain for absorbing said undesired frequency and providing additional receiving power for said first desired frequency.

6. A method for reception of multiple channels on a single broadcast band, said method comprising the steps of;
   receiving a multi-frequency analog RF signal;
   filtering said multi-frequency analog RF signal into a predetermined number of desired analog frequencies;
   combining only said predetermined number of desired analog frequencies into a single combined analog signal;
   digitizing said single combined analog signal into a digitized combined signal;
   simultaneously selecting a plurality of desired signals having different frequencies from a digital tuner that receives said digitized combined signal.

7. The method as claimed in claim 6 wherein said step of filtering further comprises filtering said multi-frequency analog RF signals into a predetermined number of desired analog frequencies through a plurality of independently tunable bandpass filters.

8. A method for rejecting an undesired frequency signal in a single broadcast band while improving reception of a desired frequency signal in the broadcast band, said method comprising the steps of:
   receiving a desired signal from the broadcast band;
   filtering said desired signal through a first tunable bandpass filter;
   receiving a predetermined undesired signal from the broadcast band;
   filtering said predetermined undesired signal through a second tunable bandpass filter;
   adjusting an automatic gain control for said second tunable bandpass filter to a minimum gain thereby absorbing said predetermined undesired signal; and
   digitizing said desired signal.

* * * * *